Oct. 25, 1938.  P. F. KIPFER  2,134,285
TWO-STROKE INTERNAL COMBUSTION ENGINE
Filed Jan. 2, 1936  3 Sheets-Sheet 1
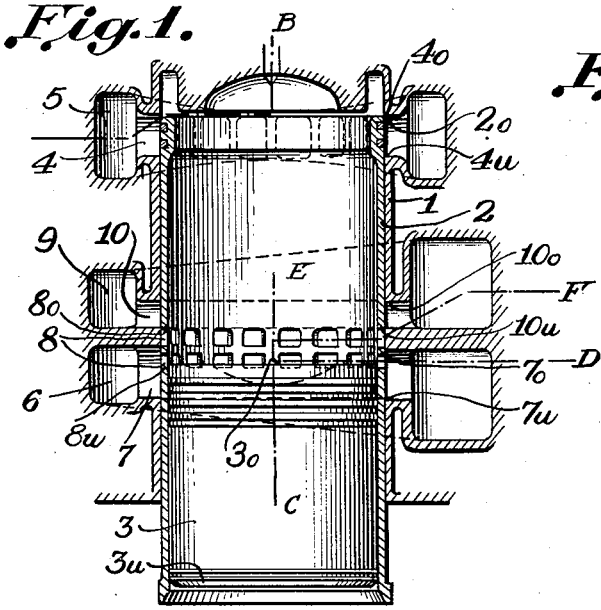
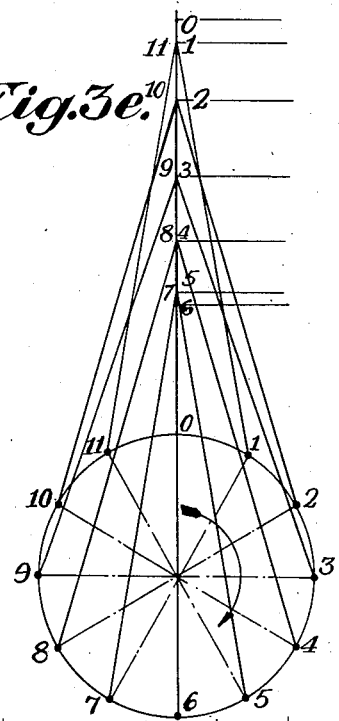
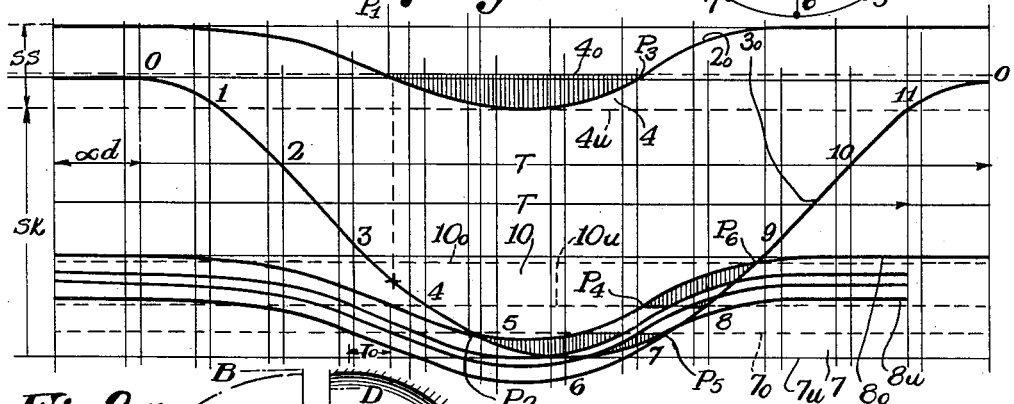
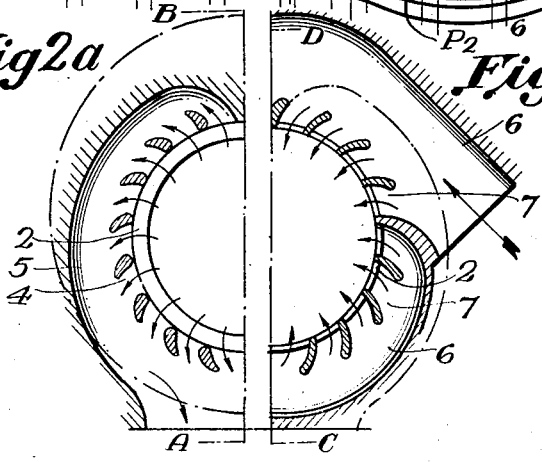
Inventor:
PAUL FRITZ KIPFER
Attorney

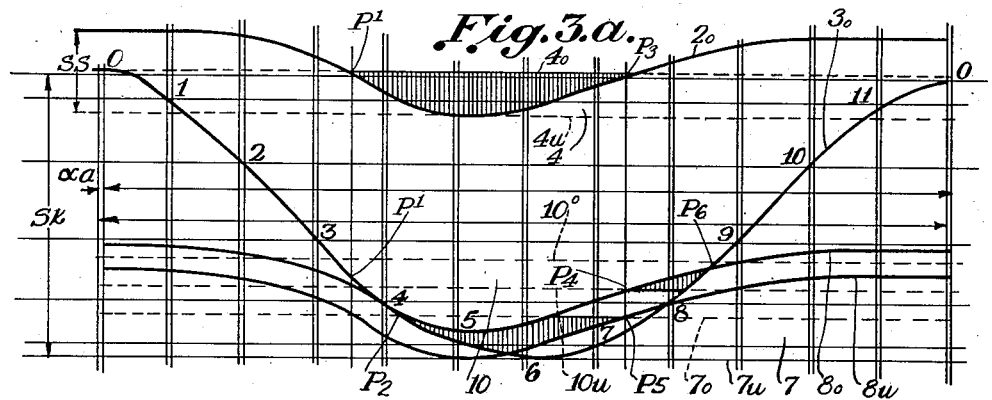
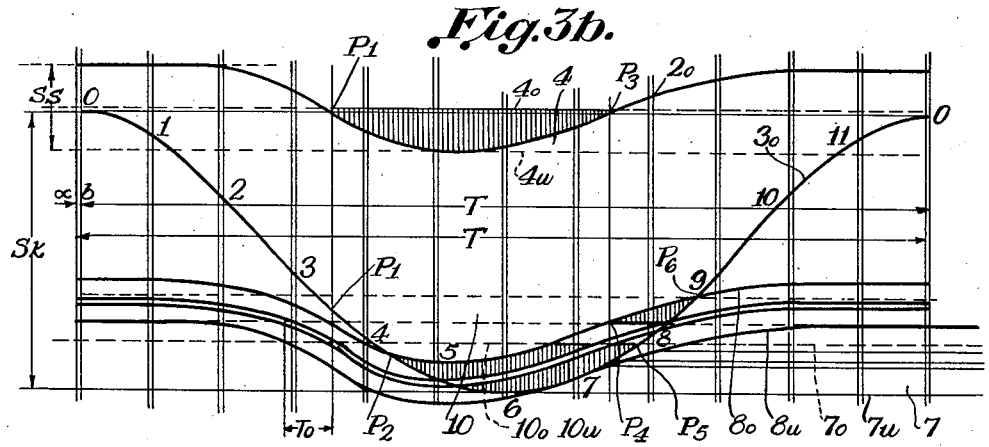
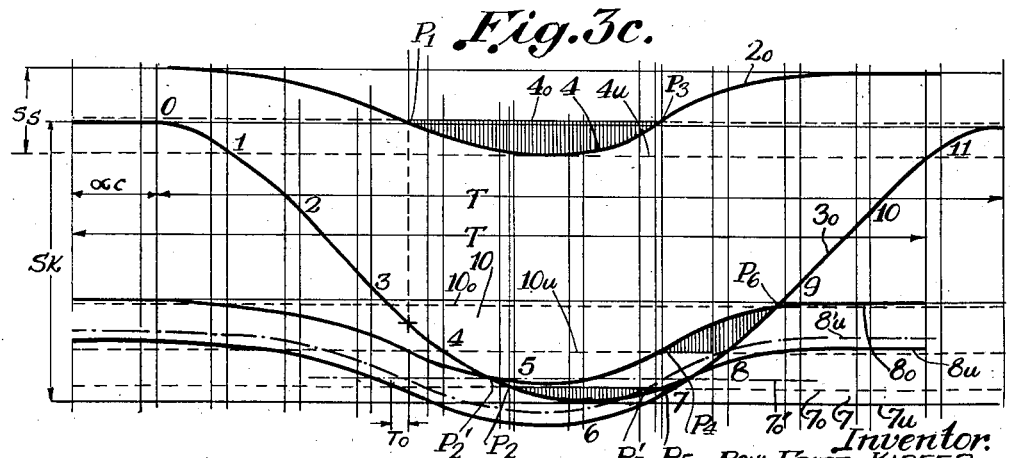

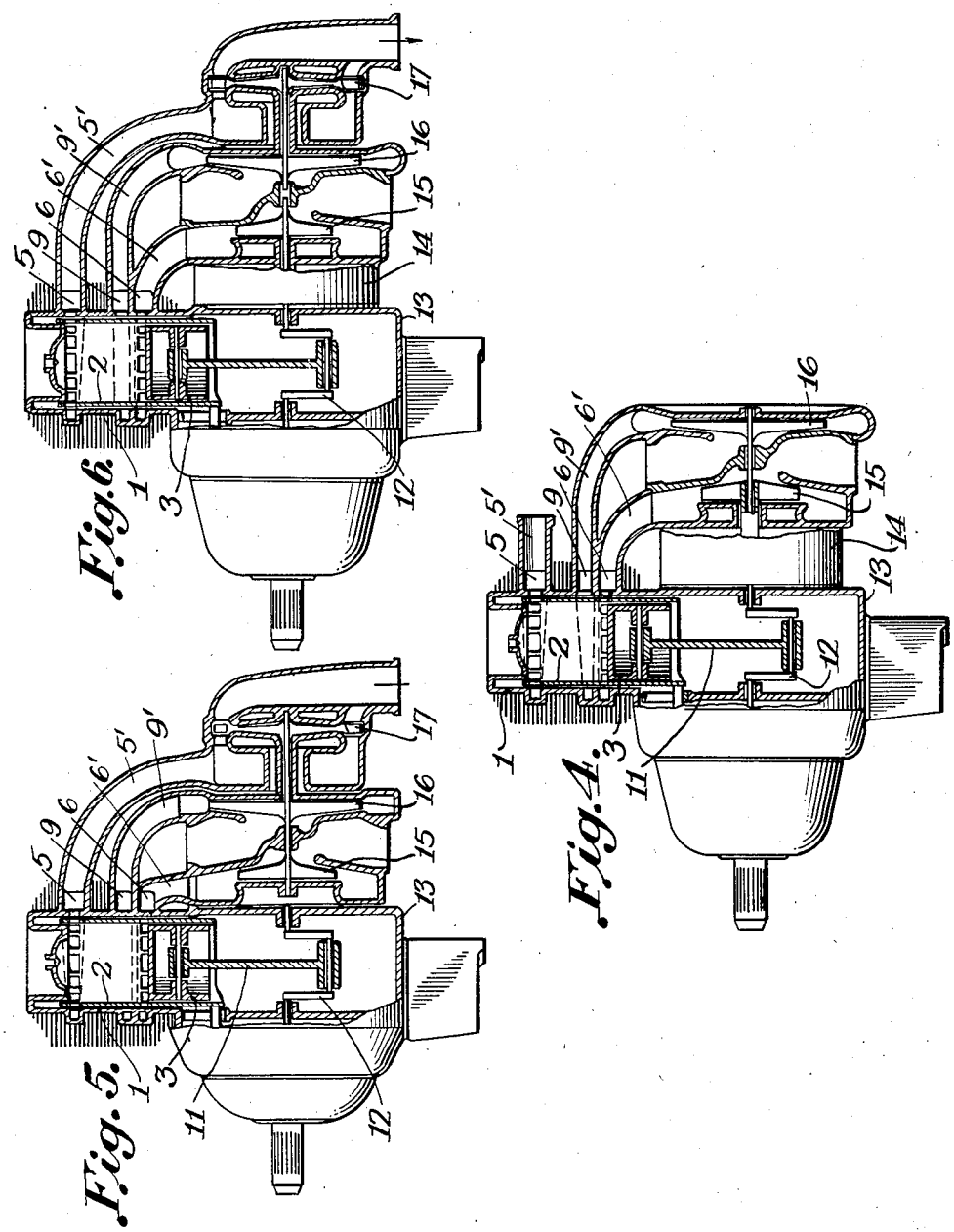

Patented Oct. 25, 1938

2,134,285

UNITED STATES PATENT OFFICE 2,134,285

TWO-STROKE INTERNAL COMBUSTION ENGINE

Paul Fritz Kipfer, Boitsfort, near Brussels, Belgium

Application January 2, 1936, Serial No. 57,126
In Germany January 3, 1935

19 Claims.  (Cl. 123—65)

The invention relates to a two-stroke internal combustion engine in which the outlet for the exhaust and scavenging gas into the open air or to the turbine at the upper end of the working chamber is controlled by a slide valve and the inlet from the individual manifolds for the scavenging and combustion air and for the fuel mixture into the lower end of the working chamber which is scavenged in uni-directional flow is controlled by the upper edge of the working piston and by one and the same sleeve valve, the control being effected in such manner that the inlet ports are opened prior to driving or after the closure of the exhaust ports and the scavenging ports are closed simultaneously with, before or after the exhaust ports, the pressures in the manifolds for scavenging and for charging being the same or different.

The introduction of the scavenging and combustion air and of the fuel mixture into the working chamber at the same or different pressures and wholly or approximately in succession in respect of time affords various fundamental advantages both for machines in which the mixture is formed inside the working chamber as well as for machines in which the mixture is formed outside the working chamber.

1. In both types of machine, the scavenging air and the combustion air on the one hand and the fuel mixture on the other hand can be supplied to the working chamber in quantities and at pressures precisely corresponding to the working conditions in the machine. In other words, the work performed in scavenging and charging can be reduced to a minimum.

2. In machines with external mixture formation, the combustion gases can be scavenged with pure air and after the closure of the exhaust outlet and scavenging air inlet ports the fuel-air mixture can be supplied to the working chamber in any desired quantity and at any desired pressure without loss.

3. In machines with external mixture formation as well as in machines with internal mixture formation, the possibility is afforded of directing all the gases leaving the working chamber through the exhaust ports to the rotor of a waste gas turbo-precompressor and thus to produce either the scavenging or combustion air or the fuel mixture, or in internal combustion machines with external mixture formation and electric ignition, e. g., benzine motors, the scavenging air as well as the fuel mixture can be produced in the requisite quantity and at the requisite pressure. In motors with external mixture forma-
tion, this is possible because due to the small expansion ratio the energy of the combustion gases at the moment of their emergence from the combustion chamber is still materially greater than in machines with compression ignition and the associated high expansion ratio. If, in machines with compression ignition it is desired to produce both the scavenging and the combustion air by one and the same waste gas turbo-compressor, then this is possible only by first directing the more highly compressed combustion gases into the turbine and thereafter directing the less cool compressed residual gases which are mixed with scavenging air into the open air. In machines with external mixture formation and electric ignition, e. g., benzine motors, more particularly with two stroke engines with large cylinder capacity it is almost a vital necessity that the combustion gases directed to the waste gas turbine should have their temperature materially reduced by the addition of cooler scavenging air. It is immaterial that the available energy of the waste gas is thereby reduced, because the waste gas turbo precompressor has preferably to produce either the scavenging air alone or the fuel mixture alone, this being possible due to the separate and wholly or partly consecutive introduction into the working chamber of the scavenging air and the fuel mixture.

In machines with internal mixture formation as well as in machines with external mixture formation it is of particular advantage to produce the combustion air or the fuel mixture by means of the waste gas turbo-precompressor, because the waste gas turbo-prescompressor automatically adapts itself to any desired load on the internal combustion engine because the output of the waste gas turbine is always in equilibrium with the output of the turbo-precompressor. This latter fact is of particular significance in machine aggregates for flight at high altitudes as the pressure drop in the turbine which increases considerably with increasing altitude is converted directly into charging energy by the turbine and the turbo-precompressor.

Fig. 1 is a longitudinal section of a cylinder embodying the invention;

Figs. 2a and 2b are transverse sections of the same, Fig. 2a being taken along the line C—D, and Fig. 2b being taken along the line E—F of Fig. 1;

Figs. 3a, 3b, 3c and 3d are diagrams representing four variations of the displacement-time diagrams of the piston and sleeve valve motion;

Fig. 3e is a diagram of the crank drive for the displacement-time diagrams of Figs. 3a to 3d inclusive;

Fig. 4 is a longitudinal section of an internal combustion motor embodying the invention;

Fig. 5 is a longitudinal section of a slightly modified form of internal combustion engine embodying the invention; and Fig. 6 is a longitudinal section of another modified form of internal combustion engine embodying the invention.

Fig. 1 shows in longitudinal section an embodiment of a cylinder 1 working on the above principle with the associated sleeve valve 2. The corresponding piston 3 with its upper edge 3o and its lower edge 3u is shown in elevation. Fig. 2 is a composite figure, the portion A—B shows an equatorial section along the line A—B of Fig. 1 through the outlet ports 4 and the exhaust manifold 5 at the upper end of the cylinder 1, while the portion C—D shows an equatorial section along the line C—D of Fig. 1 through the scavenging air manifold 6 and the scavenging air inlet ports 7 at the lower end of the working cylinder and through the inlet ports 8 in the sleeve valve. The manifold 9 for the combustion air or fuel mixture and the inlet ports 10 for these gases into the working chamber are arranged directly above the manifold 6 and the inlet ports 7 for the scavenging air for the cylinder. To ensure a proper transmission of force along the walls of the cylinder the strips as well as the conduits 6 and 9 in the working cylinder 1 are arranged exactly one over the other and have the same cross-section or at least similar cross-sections. Thus in Fig. 2, the portion C—D represents sections both along the line C—D and along the line E—F of Fig. 1.

Figs. 3a, 3b, 3c and 3d represent four variations of the displacement-time diagrams of the piston and the sleeve valve motion and the time cross-sections—resulting from the co-operation of the upper edge 2o of the sleeve valve, of the ports 4 in the cylinder 1 and the ports 8 in the sleeve valve, the upper edge 3o of the piston and the ports 7 and 10 in the cylinder—for the outlet of the combustion and scavenging gases into the open air or to the manifold 5 leading to the turbine, the inlet for the scavenging air from the manifold 6 into the working chamber and the inlet of the combustion air or fuel mixture from the manifold 9 into the working chamber.

Fig. 3e also shows diagrammatically the crank-drive from which the displacement-time curves of Figs. 3a—d for the controlling upper edge 3o of the piston are derived.

This derivation is effected by dividing the circle described by the crank in one revolution into 12 parts and plotting out horizontally from left to right, whereas the corresponding position of the upper edge of the piston is marked vertically over each point. In the resultant displacement-time diagrams for the upper edge 3o of the piston, the corresponding positions of the upper edge 2o of the sleeve valve which controls the outlet for the combustion and scavenging gases as well as the upper and lower edges 8o and 8u of the sleeve valve inlet ports 8 which control the inlet of the scavenging and combustion air or the fuel mixture are drawn in on the same scale for the twelve positions of the upper edge of the piston. Finally, by inserting the fixed upper and lower edges 4o and 4u of those ports 4 in the cylinder 1 which direct the combustion and scavenging gases into the manifold 5 and thence into the open air or to the turbine, the fixed upper and lower edges 7o and 7u of those ports 7 which introduce the scavenging air into the working chamber and the fixed upper and lower edges 10o and 10u of those ports 10 which introduce the combustion air or fuel mixture into the working chamber, the various Figs. 3a—d are obtained and the time-cross-section variations in the various control openings are shown for a complete cycle.

In order to be able to regard these vertically-shaded displacement-time diagrams of Figs. 3a—d as proportional time cross-section diagrams, it is assumed that the effective width of all outlets and inlet ports is the same. In the four diagrams the stroke $s_k$ of the piston, the stroke $s_s$ of the sleeve valve, as well as the commencement P1 of the outlet of the combustion and scavenging gases into the manifold 5 leading to the open air or to the turbine, are kept the same. In all four digrams the motion of the sleeve valve has an angular phase difference $\alpha a$—d with respect to the motion of the piston.

The conduits in the working cylinder, the sleeve valve with its controlling upper edge and its inlet ports and the piston co-operate as follows.

Under the pressure of the combustion gases the piston 3 moves from top dead centre to bottom dead centre and by means of the connecting rod performs work on the crank shaft. Lagging by the angle $\alpha$ and with smaller average speed, the sleeve valve 2 moves in the same direction. About one third before the bottom dead-centre of the piston the upper edge 2o of the sleeve valve reaches and passes over the fixed upper edge 4o of the outlet ports 4 at the upper end of the cylinder (Figs. 3 a—d, point P1). As the sleeve valve is here moving at its maximum speed, the gap between upper edge 2o of the sleeve valve and the upper edge 4o of the outlet ports 4 increases very rapidly and the combustion gases flow with small throttle loss through the ports and the manifold 5 either to the vanes of the turbine rotor or to the open air. At the moment at which the pressure in the cylinder has fallen to the pressure in the manifold 6 or approximately thereto or below the same, the upper edge 3o of the piston, the upper edge 8o of the inlet ports in the sleeve valve and the fixed upper edge 7c of the scavenging air inlet ports 7 in the cylinder 1 coincide (Figs. 3a, c, d, point P2). The upper edge 8o of the inlet ports 8 in the sleeve valve 2 may slide over the fixed upper edge 7o of the scavenging air inlet ports 7 in the cylinder 1 before the upper edge 3o of the piston coincides therewith (Fig. 3b, point P2). As at this point the speed of the piston is materially greater than that of the sleeve valve, the gap between upper edge of piston and upper edge of inlet ports in sleeve valve increases rapidly and the residual combustion gases in the working chambers are expelled in unidirectional flow at the upper end of the working chamber through the outlet ports 4 into the manifold 5 by the scavenging air entering the lower end of the working chamber through said ports. This intensive expulsion of the residual gases by scavenging air continues until the sleeve valve 2 and after it the piston 3 have passed through bottom dead-centre and the sleeve valve 2 in its upward motion again reaches the upper edge 4o of the outlet ports 4 in the working cylinder 1 and closes them by the passage thereover of its upper edge 2o (Figs. 3a—d, point P3). At this moment, or a little before, or a little later, the entry of scavenging air into the working chamber is stopped by the lower edge 8u of the inlet ports 8 in the sleeve valve 2 passing over the fixed upper edge 7o of the scavenging air inlet ports 7 in the cylinder 1, while on the other hand combustion air or fuel mixture is admitted into the working chamber through the ports 10 due to the upper edge 8o of the inlet ports 8 of the sleeve valve 2 passing over the fixed lower edge 10u of the inlet ports in the cylinder 1. As here the sleeve valve is moving at its maximum upward speed, the scavenging air inlet ports 8 are closed very rapidly whereas the inlet ports 10 for the combustion air or fuel mixture are opened very quickly (Figs. 3a—c, points P4 and P5). About two-thirds before its top dead centre the upper edge 3o of the piston 3 again overtakes the upper edge 8o of the inlet ports 8 in the sleeve valve 2 and the inlet for the combustion air or fuel mixture is again closed due to common passage over the fixed upper edge 10o of the ports 10 in the cylinder 2 (Figs. 3a—d, point P6). As here the piston is moving at its maximum upward speed whereas the speed of the sleeve valve has dropped almost to zero, the ports are closed very abruptly. In this way a large cross-section is obtained with very short period of charging. As from the commencement of the opening of the charging ports, the scavenging and exhaust ports are fully or almost closed, the charging pressure can be made as high as desired without loss of combustion air or fuel mixture.

The ideal case of a control for precisely maintaining separate the scavenging air and the combustion air or fuel mixture is that the inlet ports for the scavenging air and the outlet ports for the exhaust and scavenged gases are closed simultaneously and exactly at the moment at which the inlet ports for the combustion air or fuel mixture are opened.

Such a case is shown in the control diagram of Fig. 3a. In Fig. 3b only the condition that the outlet conduits for the exhaust and scavenged gases are closed at the moment at which the inlet ports for admitting the combustion air or fuel mixture into the working chamber are opened, is fulfilled whereas the inlet ports for admitting scavenging air into the working chamber are not closed until somewhat after the opening of the charging ports. The latter feature is of advantage in that somewhat larger time cross-sections are afforded for the admission of scavenging air into the working chamber. At very high piston speed, the exhaust ports can with advantage first be closed during the charging period to afford as large time cross sections as possible. The overlapping of the charging and exhaust ports can be carried further the greater the average piston speed of the machine in question because a certain time is always taken for the air or mixture entering tangentially at the lower end of the working chamber to traverse the entire chamber and reach the outlet ports at the upper end of the chamber. To prevent combustion gas from flowing back into the manifold 6 when the control periods overlap very considerably or if the scavenging ports 7 are opened too early and to prevent air or mixture from passing through the ports 7 into the manifold 6 if the ports 7 are closed too late, the controlling edges both fixed and movable must be rounded off considerably like a nozzle inlet in the desired main direction of flow and must be as sharp edged as possible in the undesired direction of flow. This detail is of great importance for high speed high efficiency machines as in this way the coefficient of flow in the desired direction amounts to 0.97 whereas in the undesired direction it is only about 0.6 which is equivalent to minimum resistance in the desired direction of flow and maximum resistance in the undesired direction.

The controls according to Figures 3c and 3d are characterized on the one hand by very small scavenging air inlet time cross sections and on the other hand by remarkably large charging time cross sections. These control diagrams are suitable for machines with internal mixture formation as well as with external mixture formation, more particularly for flight at great altitudes. With exhaust into the open air the last combustion residues are displaced by the incoming scavenging air expanding to the external pressure whereafter the completely emptied working cylinder is charged with fresh air or mixture at normal atmospheric pressure or at a higher pressure. In machines in which the exhaust and scavenging must overcome the counter-pressure of a turbine the scavenging time cross section is preferably made somewhat greater than in the above case. In Figure 3c this is effected by raising the fixed and movable control edges 7o and 8o without reducing the charging time cross section. New movable and fixed control edges 7'o and 8'o are obtained with the new control points P'2 and P'5.

By suitable choice of the phase angle α of the motion of the sleeve valve relatively to the motion of the piston as well as the relative position of the individual fixed and movable control edges in the cylinder and sleeve valve, as well as by suitable choice of the speed-time curve of the motion of the sleeve valve during one reciprocation it is possible to vary the control cross sections, control times and overlaps within wide limits and to adapt them to any type of machine and its particular problems.

It is seen from Figures 1, 3b and 3d that there the scavenging and charging ports 8 in the sleeve valve are divided into two rows by means of an equatorial strip. This strip is not absolutely necessary but nevertheless is advantageous in many cases. In the first place it protects the narrow vertical longitudinal strips between the individual ports against bending and in the second place when the scavenging and charging time cross sections overlap very considerably it prevents air or mixture from passing into the manifold 6 during the time To through the conduits formed by the ports 8 in the sleeve valve, the piston and the cylinder walls from the manifold 9.

There are the following possibilities for producing the scavenging and combustion air or the fuel mixture:

*I. Internal combustion engines with external mixture formation and electrical ignition*

1. The scavenging air as well as the fuel mixture is produced by compressors driven mechanically from the main motor itself or from an auxiliary motor, a preferably one-stage turbo-compressor being employed for the scavenging air and a one or more stage turbo-compressor for the fuel mixture, the scavenging and charging compressors forming a compact aggregate with a common shaft.

2. The scavenging air as well as the fuel mixture is formed by single stage or preferably two or more stage turbo-compressors driven by a turbine operated by the waste gases from the internal combustion engine, all rotors of each turbine associated with a scavenging and charging compressor being mounted on a common shaft and compressors and turbine forming a compact aggregate.

3. Either the fuel mixture or the scavenging air but preferably the latter is produced by a compressor driven mechanically from the main motor itself or an auxiliary motor whereas the fuel mixture or scavenging air is produced by a turbo-precompressor operated by the waste gases of the internal combustion engine, all rotors of this aggregate being carried on a common shaft.

*II. Internal combustion engine with internal mixture formation and compression ignition*

1. The scavenging air and the combustion air are produced by compressors driven mechanically from the main motor itself or an auxiliary motor, a single stage turbo-compressor preferably being employed for the scavenging air and a two or multi-stage compressor for the combustion air, scavenging and charging compressors forming a compact aggregate with a common shaft.

2. The combustion air or the scavenging air but preferably the latter is produced by a compressor driven mechanically from the main motor itself or an auxiliary motor whereas the combustion air or the scavenging air is produced by a turbo-precompressor operated by the waste gases of the internal combustion engine, all rotors of this aggregate being carried on a common shaft.

On the basis of the above possibilities it lies within the free judgment of the engineer to employ for his machine the most suitable combination for producing the scavenging and combustion air or fuel mixture.

Constructionally the mechanically driven compressors are preferably mounted at the free end of the internal combustion engine whereas with the use of waste gas turbo-precompressors in machines with one or more rows of cylinders, at least one such aggregate is mounted on one side or on both sides of each row of cylinders or at least one such aggregate is mounted between each two rows of cylinders, the mounting being effected in such manner that the common shaft of the turbine and compressor or compressors of each such aggregate lies in a corresponding plane approximately or exactly at right angles to the crank shaft whereby it is attained that by arranging the compressor or compressors at the lower end and the turbine at the upper end of the corresponding common shaft both turbine and compressor or compressors are disposed with their pressure sockets in the immediate vicinity of their connections at the upper and lower ends of the working cylinder. Due to the use of shortest possible pressure conduits there result minimum energy losses, minimum weight and occupation of minimum space. In internal combustion engines constructed in the form of single or double star the compressor driven mechanically from the motor itself as well as the waste gas turbo-precompressor is mounted approximately or precisely centrally with respect to the crank shaft at the free end of the motor. The conduits for the waste gases then extend radially from the heads of the cylinders into the corresponding sectors of the turbine whereas the scavenging and combustion air or the fuel mixture are introduced into the working chambers at the lower ends of the cylinders by shortest possible sockets from the individual manifolds of the two compressors.

The turbine is connected to the cylinders of the internal combustion engine preferably in such manner that the exhaust gases of those cylinders whose exhaust control periods overlap only very little or not at all are collected in a common spiral housing of a corresponding turbine rotor or in a common corresponding sector of one and the same turbine rotor or else each cylinder has its own sector in one and the same turbine rotor.

What I claim is:

1. A two-stroke cycle internal combustion engine comprising a cylinder having an exhaust port at one end and scavenging and charging ports at the other end, the charging port being between the scavenging and exhaust ports, a cylindrical sleeve valve slidably mounted within the cylinder and adapted to control the exhaust port, a piston slidably mounted within the sleeve valve, the sleeve valve and piston being operable to conjointly control the opening and closing of the scavenging and charging ports.

2. A two-stroke cycle internal combustion engine comprising a cylinder having an exhaust port at one end and scavenging and charging ports at the other end, the charging port being between the scavenging and exhaust ports, a cylindrical sleeve valve slidably mounted within the cylinder and adapted to control the exhaust port, a piston slidably mounted within the sleeve valve, the sleeve valve and piston being operable to conjointly control the opening and closing of the scavenging and charging ports, and means for effecting reciprocation of the sleeve valve and the piston, the sleeve valve having a different phase than the piston.

3. A two-stroke cycle internal combustion engine comprising a cylinder having an exhaust port at one end and scavenging and charging ports at the other end, the charging port being between the scavenging and exhaust ports, a cylindrical sleeve valve slidably mounted within the cylinder and adapted to control the exhaust port, a piston slidably mounted within the sleeve valve, the sleeve valve and piston being operable to conjointly control the opening and closing of the scavenging and charging ports, and means for reciprocating the sleeve valve and piston, the sleeve valve having a substantially shorter stroke than the piston and operable at a phase angle relative to the motion of the piston.

4. A two-stroke cycle internal combustion engine comprising a cylinder having an exhaust port at one end and scavenging and charging ports at the other end, the charging port being between the scavenging and exhaust ports, a sleeve valve slidably mounted within the cylinder adapted to control the exhaust port and having ports therethrough positioned to cooperate with the scavenging and charging ports, the sleeve valve and piston being arranged and operable to conjointly control the scavenging and charging ports and open the charging port as the sleeve valve passes through its zone of maximum velocity on the upward stroke.

5. A two-stroke cycle internal combustion engine comprising a cylinder having an exhaust port at one end and scavenging and charging ports at the other end, the charging port being between the scavenging and exhaust ports, a sleeve valve slidably mounted within the cylinder adapted to control the exhaust port and having ports therethrough positioned to cooperate with the scavenging and charging ports, the sleeve valve and piston being arranged and operable to conjointly control the scavenging and charging ports and open the scavenging port as the sleeve valve passes through its zone of maximum velocity on its downward stroke.

6. A two-stroke cycle internal combustion engine comprising a cylinder having an exhaust port at one end and scavenging and charging ports at the other end thereof, the charging port being between the scavenging and exhaust ports, a sleeve valve slidably mounted in the cylinder and positioned such that the upper edge thereof controls the exhaust port, the sleeve valve having a port therethrough positioned to cooperate with the charging port in the cylinder and another port therethrough positioned to cooperate with the scavenging port in the cylinder, the sleeve valve and piston being arranged and operable to conjointly control the scavenging ports.

7. A two-stroke cycle internal combustion engine comprising a cylinder, having longitudinally spaced exhaust ports, scavenging and charging ports, the charging ports being between the scavenging and exhaust ports, a sleeve valve slidably mounted within the cylinder, a piston slidably mounted within the sleeve valve and means for reciprocating the piston and moving the sleeve valve relatively to the piston, the sleeve valve having ports therethrough positioned to cooperate at first with the scavenging ports and thereafter with the charging ports, the sleeve valve and piston being arranged and operable to conjointly control the scavenging and charging ports, and cut off the charging port after the sleeve valve has passed its maximum velocity on its upward stroke.

8. A two-stroke cycle internal combustion engine comprising a cylinder, having longitudinally spaced exhaust ports, scavenging and charging ports, the charging ports being between the scavenging and exhaust ports, a sleeve valve slidably mounted within the cylinder, a piston slidably mounted within the sleeve valve and means for reciprocating the piston and moving the sleeve valve relatively to the piston, the sleeve valve having ports therethrough positioned to cooperate at first with the scavenging ports and thereafter with the charging ports, the sleeve valve and piston being arranged and operable to conjointly control the scavenging and charging ports, the sleeve valve opening the charging port after the sleeve valve has passed its maximum velocity and as it moves in the neighborhood of its maximum velocity on the upward stroke, and conjointly with the piston cuts off the charging port after the sleeve valve has passed its maximum velocity on its upward stroke.

9. A two-stroke cycle internal combustion engine comprising a cylinder, having longitudinally spaced exhaust ports, scavenging and charging ports, the charging ports being between the scavenging and exhaust ports, a sleeve valve slidably mounted within the cylinder, a piston slidably mounted within the sleeve valve and means for reciprocating the piston and moving the sleeve valve relatively to the piston, the sleeve valve having ports therethrough positioned to cooperate at first with the scavenging ports and thereafter with the charging ports, the sleeve valve and piston being arranged and operable to conjointly control the scavenging and charging ports, the sleeve valve passing a zone of maximum deceleration after having passed its maximum velocity on its upward stroke but before reaching its upper dead centre position.

10. A two-stroke cycle internal combustion engine comprising a cylinder, having longitudinally spaced exhaust ports, scavenging and charging ports, the charging ports being between the scavenging and exhaust ports, a sleeve valve slidably mounted within the cylinder, a piston slidably mounted within the sleeve valve and means for reciprocating the piston and moving the sleeve valve relatively to the piston, the sleeve valve having ports therethrough positioned to cooperate at first with the scavenging ports and thereafter with the charging ports, the sleeve valve and piston being arranged and operable to conjointly control the scavenging and charging ports, the sleeve valve passing a zone of maximum deceleration after having passed its maximum velocity on its upward stroke before conjointly with the piston cutting off the charging port.

11. A two-stroke cycle internal combustion engine comprising a cylinder, having longitudinally spaced exhaust ports, scavenging and charging ports, the charging ports being between the scavenging and exhaust ports, a sleeve valve slidably mounted within the cylinder, a piston slidably mounted within the sleeve valve and means for reciprocating the piston and moving the sleeve valve relatively to the piston, the sleeve valve having ports therethrough positioned to cooperate at first with the scavenging ports and thereafter with the charging ports, the sleeve valve and piston being arranged and operable to conjointly control the scavenging and charging ports, the sleeve valve passing a zone of maximum acceleration after having passed its upper dead center position but before reaching its maximum velocity on its downward stroke.

12. A two-stroke cycle internal combustion engine comprising a cylinder, having longitudinally spaced exhaust ports, scavenging and charging ports, the charging ports being between the scavenging and exhaust ports, a sleeve valve slidably mounted within the cylinder, a piston slidably mounted within the sleeve valve and means for reciprocating the piston and moving the sleeve valve relatively to the piston, the sleeve valve having ports therethrough positioned to cooperate at first with the scavenging ports and thereafter with the charging ports, the sleeve valve and piston being arranged and operable to conjointly control the scavenging and charging ports, the sleeve valve passing its maximum acceleration after having passed its maximum velocity on its downward stroke but before opening the charging port.

13. A two-stroke cycle internal combustion engine comprising a cylinder, having longitudinally spaced exhaust ports, scavenging and charging ports, the charging ports being between the scavenging and exhaust ports, a sleeve valve slidably mounted within the cylinder adapted to control the exhaust ports, a piston slidably mounted within the sleeve valve and means for reciprocating the piston and moving the sleeve valve relatively to the piston, the sleeve valve having ports therethrough positioned to cooperate at first with the scavenging ports and thereafter with the charging ports, the sleeve valve and piston being arranged and operable to conjointly control the scavenging and charging ports and cut off the charging port after the sleeve valve has passed its maximum velocity on its upward stroke.

14. A two-stroke cycle internal combustion engine comprising a cylinder, having longitudinally spaced exhaust ports, scavenging and charging ports, the charging ports being between the scavenging and exhaust ports, a sleeve valve slidably mounted within the cylinder adapted to control the exhaust ports, a piston slidably mounted within the sleeve valve and means for reciprocating the piston and moving the sleeve valve relatively to the piston, the sleeve valve having ports therethrough positioned to cooperate at first with the scavenging ports and thereafter with the charging ports, the sleeve valve and piston being arranged and operable to conjointly control the scavenging and charging ports, the sleeve valve opening the charging port as it moves in the neighborhood of its maximum velocity on its upward stroke and conjointly with the piston cuts off the charging port after the sleeve valve has passed its maximum velocity on its upward stroke.

15. A two-stroke cycle internal combustion engine comprising a cylinder, having longitudinally spaced exhaust ports, scavenging and charging ports, the charging ports being between the scavenging and exhaust ports, a sleeve valve slidably mounted within the cylinder adapted to control the exhaust ports, a piston slidably mounted within the sleeve valve and means for reciprocating the piston and moving the sleeve valve relatively to the piston, the sleeve valve having ports therethrough positioned to cooperate at first with the scavenging ports and thereafter with the charging ports, the sleeve valve and piston being arranged and operable to conjointly control the scavenging and charging ports and cut off the charging port as the piston moves in the neighborhood of its maximum velocity on its upward stroke.

16. A two-stroke cycle internal combustion engine comprising a cylinder, having longitudinally spaced exhaust ports, scavenging and charging ports, the charging ports being between the scavenging and exhaust ports, a sleeve valve slidably mounted within the cylinder adapted to control the exhaust ports, a piston slidably mounted within the sleeve valve and means for reciprocating the piston and moving the sleeve valve relatively to the piston, the sleeve valve having ports therethrough positioned to cooperate at first with the scavenging ports and thereafter with the charging ports, the sleeve valve and piston being arranged and operable to conjointly control the scavenging and charging ports, the sleeve valve opening the charging port before cutting off the exhaust port.

17. A two-stroke cycle internal combustion engine comprising a cylinder, having longitudinally spaced exhaust ports, scavenging and charging ports, the charging ports being between the scavenging and exhaust ports, a sleeve valve slidably mounted within the cylinder adapted to control the exhaust ports, a piston slidably mounted within the sleeve valve and means for reciprocating the piston and moving the sleeve valve relatively to the piston, the sleeve valve having ports therethrough positioned to cooperate at first with the scavenging ports and thereafter with the charging ports, the sleeve valve and piston being arranged and operable to conjointly control the scavenging and charging ports, the sleeve valve opening the exhaust port as it moves in the neighborhood of its maximum velocity on its downward stroke and cuts off the exhaust port and thereafter the scavenging port as the sleeve valve moves in the neighborhood of its maximum velocity on its upward stroke.

18. A two-stroke cycle internal combustion engine comprising a cylinder, having longitudinally spaced exhaust ports, scavenging and charging ports, the charging ports being between the scavenging and exhaust ports, a sleeve valve slidably mounted within the cylinder adapted to control the exhaust ports, a piston slidably mounted within the sleeve valve and means for reciprocating the piston and moving the sleeve valve relatively to the piston, the sleeve valve having ports therethrough positioned to cooperate at first with the scavenging ports and thereafter with the charging ports, the sleeve valve and piston being arranged and operable to conjointly control the scavenging and charging ports, the sleeve valve opening the exhaust port as it moves in the neighborhood of its maximum velocity on its downward stroke and opening the charging port and cutting off the exhaust port and thereafter the scavenging port as the sleeve valve moves in the neighborhood of its maximum velocity on its upward stroke the sleeve valve and piston conjointly cutting off the charging port after the sleeve valve has passed its maximum velocity on its upward stroke.

19. A two-stroke cycle internal combustion engine comprising a cylinder, having longitudinally spaced exhaust ports, scavenging and charging ports, the charging ports being between the scavenging and exhaust ports, a sleeve valve slidably mounted within the cylinder adapted to control the exhaust ports, a piston slidably mounted within the sleeve valve and means for reciprocating the piston and moving the sleeve valve relatively to the piston, the sleeve valve having ports therethrough positioned to cooperate at first with the scavenging ports and thereafter with the charging ports, the sleeve valve and piston being arranged and operable to conjointly control the scavenging and charging ports, the sleeve valve opening the charging port and cutting off the exhaust port and thereafter the scavenging port as it moves in the neighborhood of its maximum velocity on its upward stroke, the sleeve valve and piston conjointly cutting off the charging port after the sleeve valve has passed its maximum deceleration after its maximum velocity on its upward stroke but before reaching its upper dead center position, the piston moving in the neighborhood of its maximum velocity on its upward stroke.

PAUL FRITZ KIPFER.